US006823118B2

(12) United States Patent
Hanashima

(10) Patent No.: US 6,823,118 B2
(45) Date of Patent: Nov. 23, 2004

(54) OPTICAL BRANCHING CIRCUIT AND DEVICE

(75) Inventor: Naoki Hanashima, Tokyo (JP)

(73) Assignee: TDK Corporation, Tokyo (JP)

( * ) Notice: Subject to any disclaimer, the term of this patent is extended or adjusted under 35 U.S.C. 154(b) by 37 days.

(21) Appl. No.: 10/420,830

(22) Filed: Apr. 23, 2003

(65) Prior Publication Data

US 2003/0202746 A1 Oct. 30, 2003

(30) Foreign Application Priority Data

Apr. 24, 2002 (JP) .......................................... 2002-122853

(51) Int. Cl.$^7$ ................................................ G02B 6/26
(52) U.S. Cl. .............................. 385/43; 385/45; 385/50
(58) Field of Search ............................... 385/14, 43, 44, 385/45, 50, 132

(56) References Cited

U.S. PATENT DOCUMENTS

| 5,586,209 | A | | 12/1996 | Matsuura et al. |
| 5,590,226 | A | | 12/1996 | Wolf et al. |
| 5,627,928 | A | | 5/1997 | Matsuura et al. |
| 5,745,619 | A | | 4/1998 | Li et al. |
| 5,799,119 | A | * | 8/1998 | Rolland et al. ................ 385/28 |
| 6,222,966 | B1 | * | 4/2001 | Khan et al. .................... 385/45 |
| 6,463,188 | B1 | * | 10/2002 | Takahashi et al. ............. 385/14 |

FOREIGN PATENT DOCUMENTS

| JP | A 6-67047 | 3/1994 |
| JP | A 9-33740 | 2/1997 |
| JP | A 9-80244 | 3/1997 |

OTHER PUBLICATIONS

Lucas B. Soldano et al., "Optical Multi–Mode Interference Devices Based on Self–Imaging: Principles and Applications", Journal of Lightwave Technology, vol. 13, No. 4, pp. 615–627, Apr. 1995.
Y. Hida et al., "Properties of Tandem–Aligned Silica–Based Y–Branch Optical Waveguides", Proceedings of Japanese Society of Applied Physics Annual Conference, 10p-ZN–16, 1 page, 1991 (w/Translation).

* cited by examiner

Primary Examiner—Hemang Sanghavi
(74) Attorney, Agent, or Firm—Oliff & Berridge, PLC

(57) ABSTRACT

The invention relates to an optical branching circuit connected to a light output end face of an optical waveguide circuit or an optical branching circuit and for branching input light, and has a feature to provide an optical branching circuit with less branching ratio variation. The optical branching circuit is comprised of an input optical waveguide formed on a silica glass substrate and for outputting input light inputted from a light input end face to a light output end face, a tapered optical waveguide disposed to be shifted with respect to the input optical waveguide at the light output end face, and branching optical waveguides connected to a light output end face of the tapered optical waveguide at a predetermined branching angle.

12 Claims, 4 Drawing Sheets

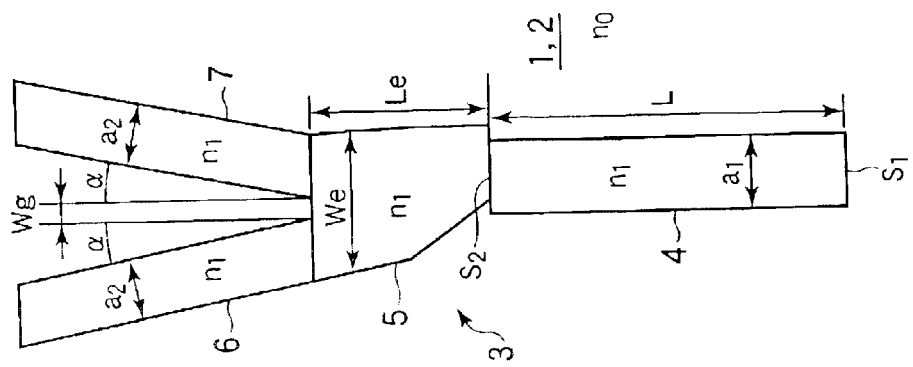
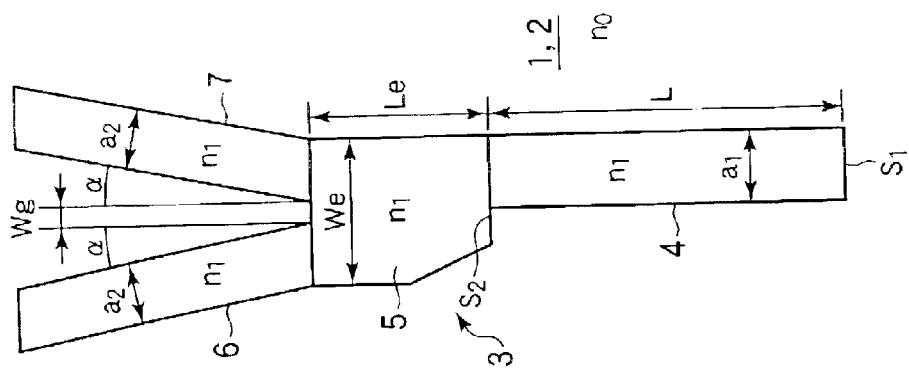
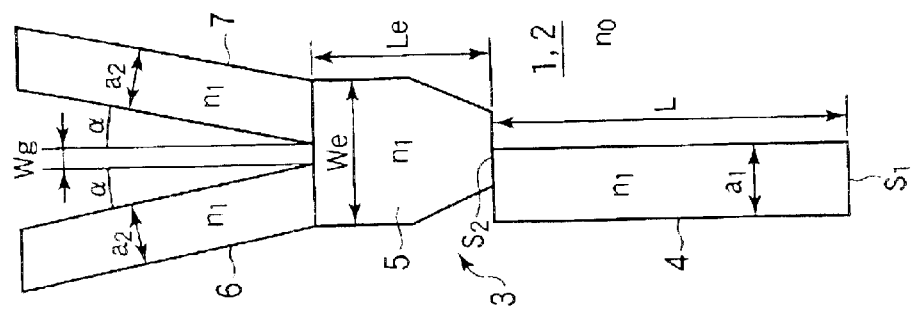

US 6,823,118 B2

OPTICAL BRANCHING CIRCUIT AND DEVICE

BACKGROUND OF THE INVENTION

1. Field of the Invention

The present invention relates to an optical branching circuit and device connected to a light output end face of an optical waveguide circuit or an optical branching circuit and for branching input light.

2. Description of the Related Art

A general optical branching circuit is comprised of an input optical waveguide, a taper-shaped transition region (tapered optical waveguide) for adiabatically changing a light distribution, and respective branching optical waveguides.

Although the optical branching circuit is designed so that optical powers propagated to the respective branching optical waveguides have a desired value (branching ratio), a measured value of an actually fabricated optical branching circuit often becomes a value different from a calculated branching ratio. For example, an optical power propagated to each of the branching optical waveguides is determined by the overlap degree of a light electric field distribution at both sides of a boundary between the tapered optical waveguide and the branching optical waveguide.

In the case where two branching optical waveguides are arranged symmetrically with each other with respect to the center of the width of the light output end face of the tapered optical waveguide, in order to obtain the one-to-one branching ratio, it is necessary that the light electric field distribution at the tapered optical waveguide side of the boundary becomes symmetrical with respect to the center of the width of the light output end face of the tapered optical waveguide. On the other hand, in order to distribute optical powers having different intensities to two branching optical waveguides by varying the branching ratio, it conventionally becomes possible by making a set of branching optical waveguides offset (shifted) at the boundary with the tapered optical waveguide in the direction parallel to the light output end face of the tapered optical waveguide.

By the way, in an actual optical branching circuit, there has been a problem that even if the shape is the same, variation in branching characteristics occurs. This is noticeable in a case where another optical circuit is connected to a front stage of the optical branching circuit. For example, in the case where the front stage is an optical fiber connection circuit, there is a case where light not coupled with a waveguide due to mode mismatching or the like mixes in the optical branching circuit along the input optical waveguide, and causes a characteristic different from a design. Besides, in the case where an optical branching circuit is connected to the front stage as well, there has been a problem that light generated at a branching portion and not coupled with the waveguide mixes in the latter stage optical branching circuit along the latter stage input optical waveguide, and causes similar variation in characteristics which can not be expected in design.

SUMMARY OF THE INVENTION

One of the features of the present invention is to provide an optical branching circuit and device with less branching ratio variation.

The above feature is achieved by an optical branching circuit characterized by comprising an input optical waveguide for outputting input light inputted from a light input end face to a light output end face, a tapered optical waveguide disposed to be shifted with respect to the input optical waveguide at the light output end face, and branching optical waveguides connected to a light output end face of the tapered optical waveguide at a predetermined branching angle.

The above optical branching circuit of the invention is characterized in that the tapered optical waveguide is disposed to be shifted by a predetermined offset amount relative to the input optical waveguide in a direction orthogonal to a center axis of the input optical waveguide.

The above optical branching circuit of the invention is characterized in that the predetermined offset amount is determined based on a wavelength of the input light.

The above feature is achieved by an optical branching device characterized by comprising plural optical branching circuits, each being the above optical branching circuit of the invention, connected in cascade.

BRIEF DESCRIPTION OF THE DRAWINGS

FIGS. 4A to 4C are views showing modified examples of the optical branching circuit of the embodiment of the invention.

DETAILED DESCRIPTION OF THE PREFERRED EMBODIMENTS

Figure 1:
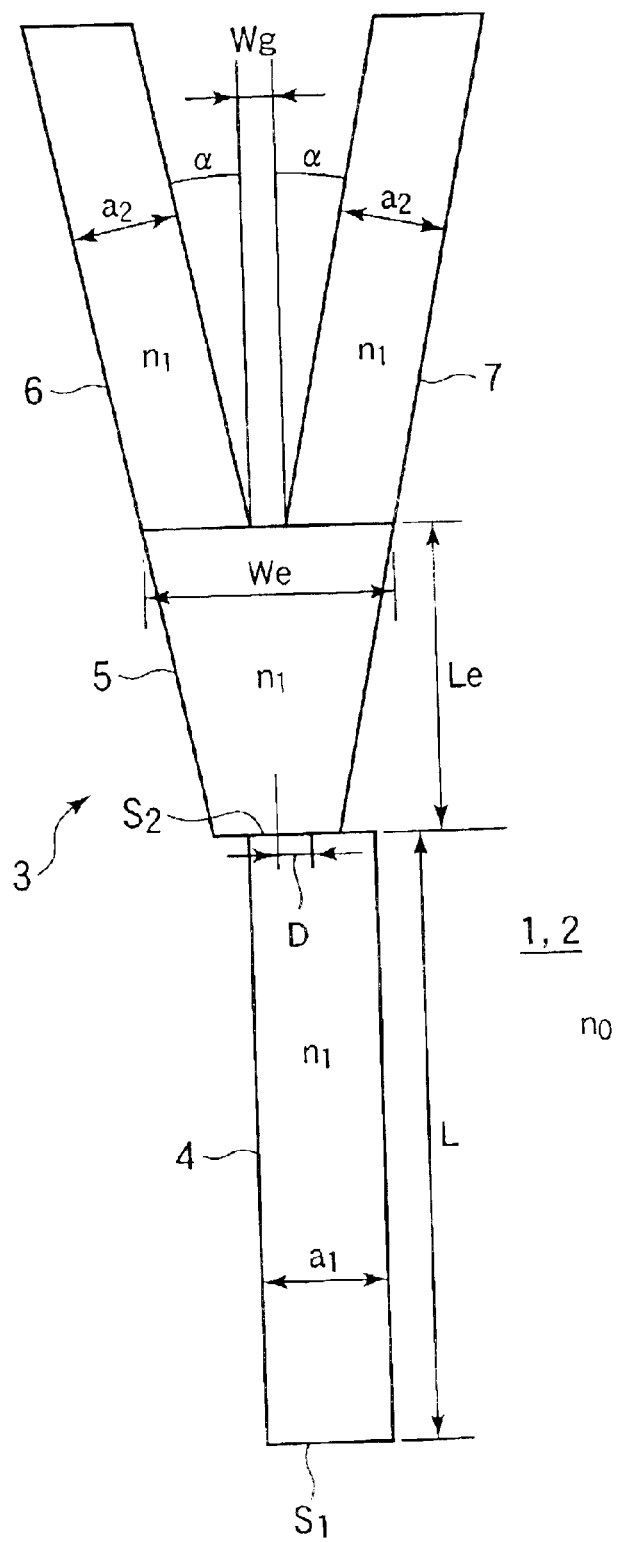
FIG. 1 is a view showing a state in which a silica glass substrate 1 on which an optical branching circuit of an embodiment of the invention is formed is seen in the direction of the normal to a substrate surface.

An optical branching circuit and device according to an embodiment of the invention will be described with reference to FIGS. 1 to 4. First, a rough structure of the optical branching circuit and device of the embodiment will be described with reference to FIG. 1. FIG. 1 shows a state in which a silica glass substrate 1 on which the optical branching circuit is formed is seen in the direction of the normal of a substrate surface. The optical branching circuit and device shown in FIG. 1 comprises a clad layer 2 having a refractive index $n_0$ and formed on the silica glass substrate 1. A core 3 having a refractive index $n_1$ larger than the refractive index $n_0$ of the clad layer 2 is embedded in the clad layer 2.

The core 3 is comprised of a linear input optical waveguide 4, a tapered optical waveguide 5 as a transition region in which a light distribution is adiabatically changed, and respective branching optical waveguides 6 and 7. The core 3 is certainly embedded in the clad layer 2.

In the linearly extending input optical waveguide 4 having an optical waveguide length L and a width $a_1$, a light input end face $S_1$ is connected to a light outgoing end face of a not-shown optical fiber, and a light output end face $S_2$ is connected to a light input end face of the tapered optical waveguide 5. The tapered optical waveguide 5 is disposed to be shifted with respect to the input optical waveguide 4 at the light output end face $S_2$ of the input optical waveguide 4 in order to suppress branching ratio variation. In this embodiment, the tapered optical waveguide 5 is shifted on the plane parallel to the substrate surface of the silica glass substrate 1 in a direction orthogonal to the center axis of the input optical waveguide 4 by an offset amount D toward the left in the drawing relative to the input optical waveguide 4.

The tapered optical waveguide 5 comprises a tapered part in which, for example, a side wall is linearly expanded at a predetermined angle toward the light output end face. A width We of the light output end face of the tapered optical waveguide 5 is wider than the width $a_1$ of the light input end face, and a length Le of the tapered optical waveguide 5 is determined on the basis of the width $a_1$, the width We and a branching angle α.

The branching optical waveguides 6 and 7 are disposed to be symmetrical at a branching angle α on both sides of the center of the light output end face of the tapered optical waveguide 5. A predetermined interval width Wg is formed between both the branching optical waveguides 6 and 7 at the light output end face of the tapered optical waveguide 5. The branching optical waveguides 6 and 7 have respectively the same width $a_2$.

Next, a manufacturing method of the optical branching circuit and device of this embodiment will be described in brief. For example, in the case of a silica glass optical waveguide, a lower clad layer is formed on the silica substrate 1. Next, a film of a core formation material is formed and patterning is made to form the core 3. Next, an upper clad layer is formed to completely embed the core 3 in a clad formation material, and then, an anneal treatment is performed and the optical branching circuit and device are completed. As a film formation method of the clad layer 2 and the core formation material, a flame hydrolysis deposition method, sputtering, evaporation, various CVD methods, sol-gel method or the like can be used. Besides, for adjustment of a refractive index and a film stress, Ge (germanium), P (phosphorous), B (boron), Ti (titanium), F (fluorine) or the like may be naturally added. Besides, instead of the silica glass substrate, a Si (silicon) substrate can also be used. Incidentally, the structure of the optical branching circuit according to this embodiment can also be applied to a waveguide of ion diffusion into an optical crystal such as lithium niobate or a glass substrate, a rib waveguide, a waveguide formed on a semiconductor substrate, or the like.

Next, a method of obtaining the optical branching circuit with less branching ratio variation by optimizing the offset amount D between the input optical waveguide 4 and the tapered optical waveguide 5 will be described.

In general, the calculation of optical waveguide propagation characteristics is made by a method called BPM (beam propagation method). In the BPM, a complex amplitude (amplitude and phase) of a light electric field changing with propagation is obtained in coordinates discretized along the propagation direction of light by substituting a complex amplitude and a distribution in a refractive index at a position immediately before a position where the complex amplitude is to be obtained into an approximated Helmholtz equation.

Incidentally, in the design of a conventional optical branching circuit, as light propagated through the input optical waveguide, consideration has been purely given to only a propagation mode. That is, it has been assumed that the light field distribution in the input optical waveguide is constant along the waveguide, and symmetrical with respect to the axis of the waveguide.

However, the present inventor found in a previous application (Japanese Patent Application No. 2002-098266 filed Apr. 1, 2002) that a leaky mode generated by a front stage optical circuit of an input optical waveguide is propagated along the input optical waveguide to interfere with a propagation mode, and "beat" generated by that causes a difference between an actually measured branching ratio and a branching ratio by calculation.

Further, when the tapered optical waveguide 5 is disposed at the light output end face $S_2$ of the input optical waveguide 4 linearly extending as in the optical branching circuit, there is a case where the branching characteristics are remarkably influenced by recombination or interference of light. This is the reason why a calculation result of a branching characteristic by the BPM is different from an actually measured value, and in order to make the branching characteristic coincide with the design value and to obtain sufficient fabrication reproducibility, it is necessary to remove the influence of leaky light by a suitable method.

Figure 2:
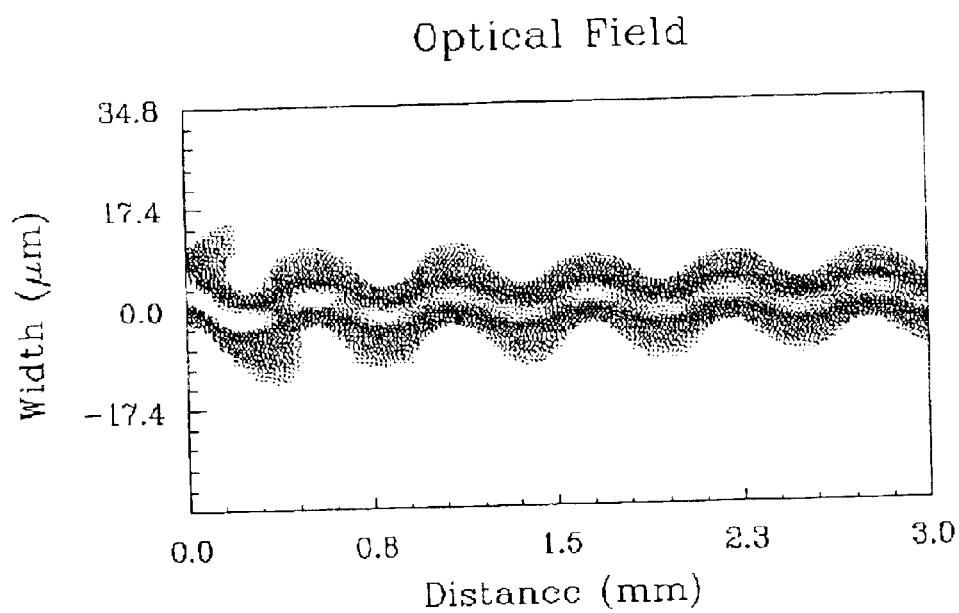
FIG. 2 is a view showing the influence of leaky light.

FIG. 2 shows an example of the influence of the leaky light. In FIG. 2, the horizontal axis indicates a distance (mm) of the input optical waveguide 4 from the light input end face $S_1$, and the vertical axis indicates a meander width (μm) of guided light. FIG. 2 shows results in which with respect to the simple linear input optical waveguide 4, an intentionally large leaky mode (that is, coupling loss) is made to be generated as an input excitation condition at the light input end face $S_1$ of the left end in the drawing, and the intensity distribution of light electric field along the propagation direction is calculated by the BPM. It is understood that the light electric field meanders along the optical waveguide direction. The meander of the light intensity along the optical waveguide direction is due to the interference between the leaky mode and the propagation mode, and this is essential cause to deteriorate the branching characteristic in the optical branching circuit.

In general, interference between modes is a state where the respective modes coexist and are propagated, and when this mode interference exists, since the respective propagation constants subtly vary, the "beat" is generated in the electric field amplitude of the propagated light. This "beat" appears as the meander phenomenon as shown in FIG. 2. Accordingly, in the optical branching circuit in which the light input end face of the tapered optical waveguide 5 is connected to the light output end face $S_2$ of the input optical waveguide 4, there occurs a case where in dependence on the optical waveguide length L of the linear input optical waveguide 4, the electric field distribution to be originally symmetrical with respect to the center axis of the optical waveguide becomes asymmetrical at the light input end face of the tapered optical waveguide 5, and the branching ratio is deteriorated by this.

Conventionally, it has been disclosed that leaky light generated by a branching part meanders along a waveguide and is propagated to deteriorate branching characteristics.

Conventionally, it has been disclosed that instead of a linear multiplexing optical waveguide, a curved multiplexing optical waveguide having a predetermined radius of curvature is used to sufficiently radiate light of a radiation mode and to suppress branching ratio variation.

Besides, JP-A-9-33740 discloses an optical tap in which branching ratio variation is suppressed by a structure in which the center axis of an input optical waveguide is shifted from the center axis of both branching optical waveguides. However, the document does not disclose the structure as in the optical branching circuit of this embodiment shown in FIG. 1, in which the tapered optical waveguide 5 is disposed to be shifted with respect to the input optical waveguide 4 at the light output end face $S_2$ of the input optical waveguide 4.

In the optical branching circuit according to this embodiment, the tapered optical waveguide 5 is disposed to be shifted with respect to the input optical waveguide 4 at the light output end face $S_2$ of the input optical waveguide 4, so that the field distribution of light incident on the tapered optical waveguide 5 is changed to decrease the branching ratio variation. According to this embodiment, it becomes possible to obtain the optical branching circuit in which a difference between a design value and an actual characteristic is small. Incidentally, the magnitude of the offset amount D can be determined for each wavelength in order to realize a desired branching characteristic for each wavelength of input light inputted to the input optical waveguide 4 of the optical branching circuit. As stated above, according to this embodiment, the excellent optical branching circuit with less branching ratio variation can be obtained.

EXAMPLE

Next, a concrete example will be described. First, a specific refractive index difference Δn between a core and a clad was made Δn=0.4%. As the structure of the optical branching circuit, the width of the incident optical waveguide 4 was $a_1$=7 μm, the length of the tapered optical waveguide 5 was Le=180 μm, and the width of the end face was We=15 μm. The gap width was Wg=1 μm, the width of each of the branching optical waveguides 6 and 7 was $a_2$=7 μm, and the branching angle was α=0.4°.

The calculation of a loss (output light power/input light power) between the input and output ports was made by the BPM (beam propagation method). In order to calculate the influence of leaky light, an initial excitation light distribution was made a Gaussian shape, and an offset was given to the center axis of the optical waveguide to intentionally generate a mode mismatching loss. With respect to the branching characteristic, a difference between output light powers from both the branching optical waveguides was made uniformity, and this change in the case where the magnitude of the offset amount D in FIG. 1 was changed was examined.

Figure 3:
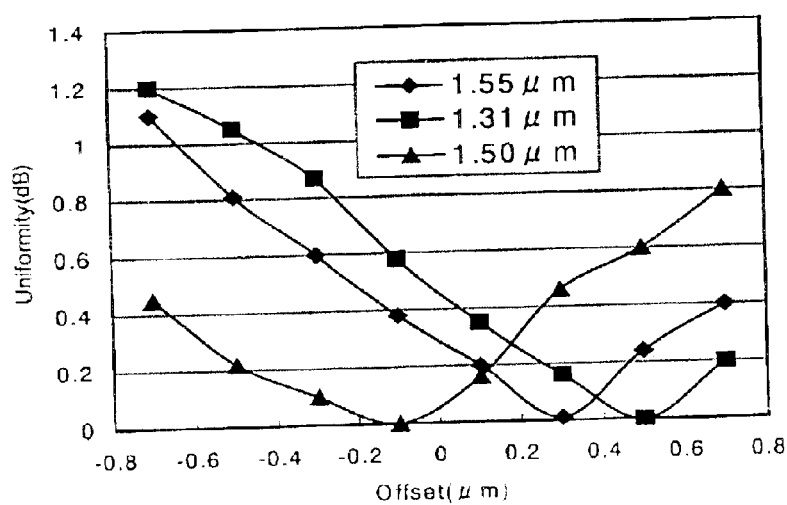
FIG. 3 is a view showing the relation between the magnitude of an offset amount D and a branching ratio in the optical branching circuit of the embodiment of the invention.

FIG. 3 shows the relation between the magnitude of the offset amount D and the branching ratio characteristic. In FIG. 3, the horizontal axis indicates the magnitude (μm) of the offset amount D, and the vertical axis indicates the uniformity (dB). As shown in FIG. 3, for example, in the case where the wavelength of the input light is λ=1.55 μm (in FIG. 3, see a curved line in which measured points are denoted by ♦ marks), the uniformity of the optical branching circuit does not become minimum at the offset amount D=0, and becomes minimum in the vicinity of 0.3 μm. This is because the meander of the light field distribution is generated by the "beat" due to the interference between the leaky mode and the propagation mode as described above, and the light field distribution excited at the light input end face of the tapered optical waveguide 5 becomes asymmetrical.

Similarly, also in the case where the wavelength of the input light is λ=1.31 μm (in FIG. 3, see a curved line in which measured points are denoted by ■ marks), the uniformity of the optical branching circuit does not become minimum at the offset amount D=0, and becomes minimum in the vicinity of 0.5 μm. Besides, in the case where the wavelength of the input light is λ=1.50 μm (in FIG. 3, see a curved line in which measured points are denoted by ▲ marks), the uniformity of the optical branching circuit does not become minimum at the offset amount D=0, and becomes minimum in the vicinity of −0.1 μm. Incidentally, the negative sign (−) of the offset amount D means shifting in the direction opposite to the case without the sign.

The reason why the offset amount D at which the uniformity of the optical branching circuit becomes minimum varies in dependence on the wavelength of the guided light (input light) is that the meander period has wavelength dependency, and when this relation is used, the optimum offset amount D for an objective wavelength can be obtained.

The invention is not limited to the above embodiment, but can be variously modified.

For example, in the above embodiment, although the tapered optical waveguide 5 comprises the tapered part in which the side wall is linearly expanded at the predetermined angle toward the light output end face, the invention is not limited to this. FIGS. 4A to 4C show modified examples of the optical branching circuit in which the shapes of tapered parts vary. FIG. 4A illustrates a tapered part in which both side walls of the optical waveguide on the side of the light output end face are parallel to each other, and FIG. 4B illustrates a structure in which one side wall of a tapered part and one side wall of the input optical waveguide are formed to have one straight line shape. FIG. 4C illustrates a structure in which the positions of the light input end face and the light output end face of the tapered part shown in FIG. 4A are shifted in the vertical direction of the drawing. In summary, as long as the tapered optical waveguide 5 is positioned between the input optical waveguide 4 and the branching optical waveguides 6 and 7, and is structured to have a function of converting the mode field distribution, the invention can be applied independently from the shape of the tapered optical waveguide 5. Even when a ridgeline of the taper has a shape comprising a curved line, the same applies. Incidentally, in the embodiment, although the branching optical waveguides 6 and 7 and the tapered optical waveguide 5 are directly connected, in order to improve a narrow gap embedding characteristic at the time of fabrication of the optical branching circuit, a structure may be naturally adopted such that a slit is provided between the branching optical waveguides 6 and 7 and the optical waveguide 5, and the slit is embedded in the clad layer.

Besides, in the case where a boundary between the input optical waveguide 4 and the tapered optical waveguide 5 is indefinite, as long as a region where the propagation mode of the waveguide is constant along the propagation direction of light is defined as the input optical waveguide 4, the side wall surface of the input optical waveguide 4 at the light output end face may be curved. Besides, even in the case where the boundary region is not linear and is connected to a smooth ridgeline because of manufacture process constraints, the invention can be satisfactorily applied.

Further, in the above embodiment, although the linearly extending input optical waveguide 4 is used, the invention is not limited to this. For example, it is also possible to use an input optical waveguide having a predetermined radius of curvature and extending curvedly.

Figure 5:
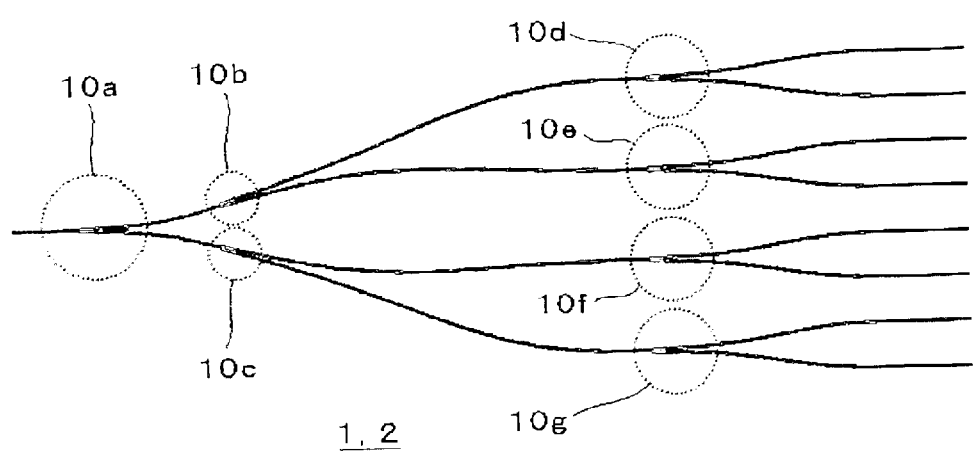
FIG. 5 is a view showing an optical power splitter using the optical branching circuit of the embodiment of the invention.

FIG. 5 shows an optical power splitter (optical branching device) constructed by using plural optical branching circuits each of which is the optical branching circuit according to the above embodiment. As shown in FIG. 5, an input optical waveguide of an optical branching circuit 10a is connected to a light output end face of a not-shown optical fiber. One of two branching optical waveguides of the optical branching circuit 10a is connected to an input optical waveguide of a next stage optical branching circuit 10b, and the other is connected to an input optical waveguide of a next stage optical branching circuit 10c. Further, two branching optical waveguides of the optical branching circuit 10b are respectively connected to optical branching circuits 10d and 10e, and two branching optical waveguides of the optical branching circuit 10c are respectively connected to optical branching circuits 10f and 10g. By the optical power splitter in which the plural stages of the optical branching circuits, each being the optical branching circuit according to the invention, are connected in cascade, one input light can be outputted from many (in this example, eight) ports while the branching ratio variation is suppressed to a minimum.

As described above, according to the invention, the optical branching circuit and device with less branching ratio variation can be realized.

What is claimed is:

1. An optical branching circuit, comprising:

an input optical waveguide for outputting input light inputted from a light input end face to a light output end face;

a tapered optical waveguide disposed to be shifted with respect to the input optical waveguide at the light output end face; and branching optical waveguides connected to a light output end face of the tapered optical waveguide at a predetermined branching angle.

2. An optical branching circuit according to claim 1, wherein the tapered optical waveguide is disposed to be shifted by a predetermined offset amount relative to the input optical waveguide in a direction orthogonal to a center axis of the input optical waveguide.

3. An optical branching circuit according to claim 2, wherein the predetermined offset amount is determined based on a wavelength of the input light.

4. An optical branching circuit according to claim 1, wherein at least one of Ge, P, B, Ti and F is incorporated in a core layer or a clad layer of the waveguides.

5. An optical branching circuit according to claim 2, wherein at least one of Ge, P, B, Ti and F is incorporated in a core layer or a clad layer of the waveguides.

6. An optical branching circuit according to claim 3, wherein at least one of Ge, P, B, Ti and F is incorporated in a core layer or a clad layer of the waveguides.

7. An optical branching device, comprising plural optical branching circuits, each being an optical branching circuit according to claim 1, connected in cascade.

8. An optical branching device, comprising plural optical branching circuits, each being an optical branching circuit according to claim 2, connected in cascade.

9. An optical branching device, comprising plural optical branching circuits, each being an optical branching circuit according to claim 3, connected in cascade.

10. An optical branching device, comprising plural optical branching circuits, each being an optical branching circuit according to claim 4, connected in cascade.

11. An optical branching device, comprising plural optical branching circuits, each being an optical branching circuit according to claim 5, connected in cascade.

12. An optical branching device, comprising plural optical branching circuits, each being an optical branching circuit according to claim 6, connected in cascade.

* * * * *